(No Model.)
E. A. MERRIMAN.
AUTOMATIC BRAKE.
No. 502,526. Patented Aug. 1, 1893.
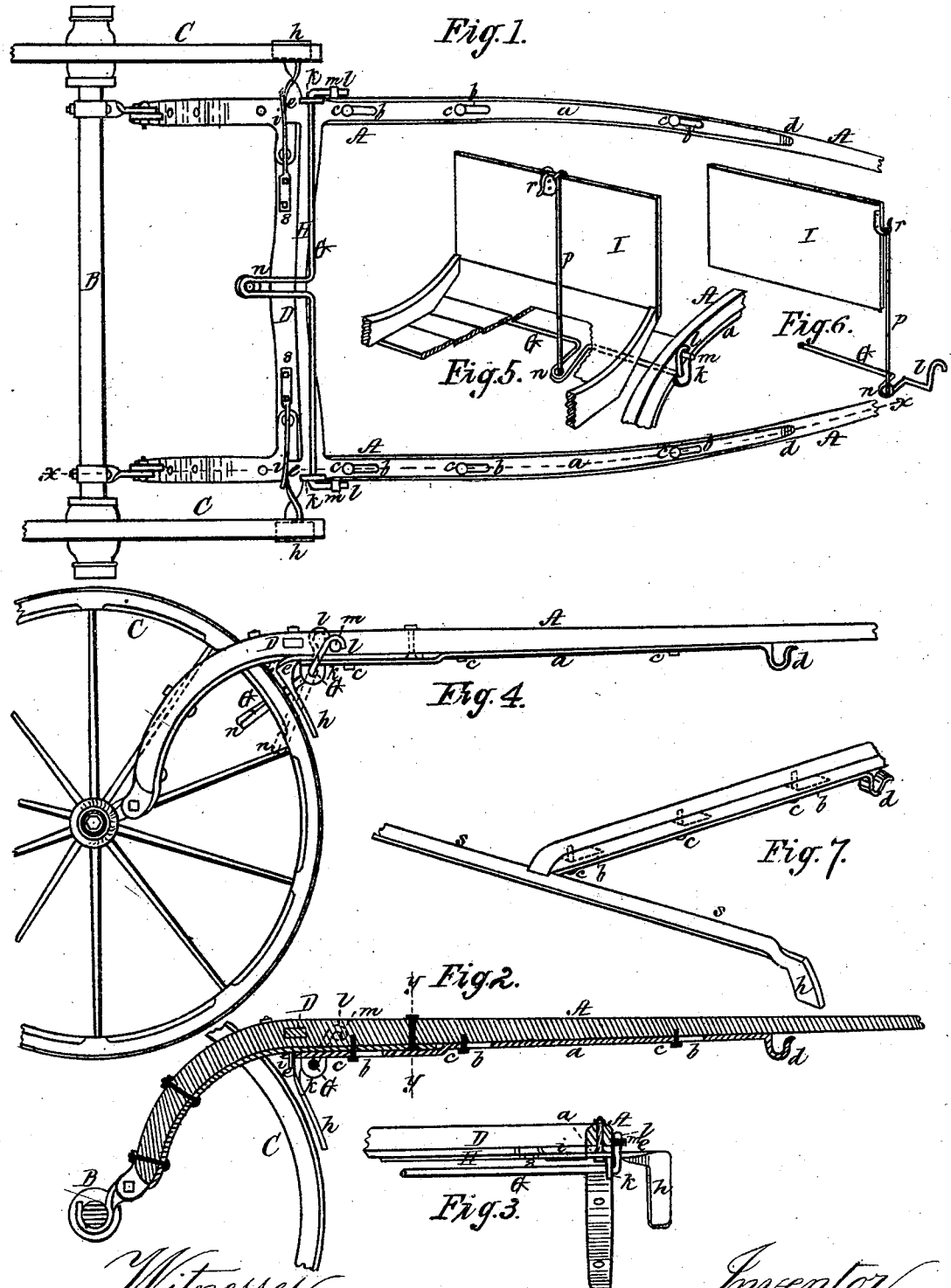
Witnesses
A. F. Stearns
E. S. Stearns
Inventor
Edward A. Merriman,
pr Norman W. Stearns Atty.

UNITED STATES PATENT OFFICE.

EDWARD A. MERRIMAN, OF MADISON, MAINE.

AUTOMATIC BRAKE.

SPECIFICATION forming part of Letters Patent No. 502,526, dated August 1, 1893.

Application filed July 25, 1892. Renewed June 29, 1893. Serial No. 479,175. (No model.)

*To all whom it may concern:*

Be it known that I, EDWARD A. MERRIMAN, of Madison, in the county of Somerset and State of Maine, have invented an Automatic Brake for Vehicles, of which the following is a full, clear, and exact description, reference being had to the accompanying drawings, making a part of this specification, in which—

Figure 1 is a plan of the under side of a pair of shafts connected with a pair of wheels and having my automatic brake applied thereto. Fig. 2 is a longitudinal section on the line $x$ $x$ of Fig. 1, the parts being right side up. Fig. 3 is a transverse section on the line $y$ $y$ of Fig. 2; Fig. 4 a side elevation. Figs. 5 and 6 represent my brake-locking device; Fig. 7 my invention applied to the pole of a vehicle.

My present invention relates to an automatic brake for vehicles in which the momentum of the vehicle in descending a hill (transmitted to the hold back strap) becomes the power by which the brake is applied and forced against the periphery of the wheel;— and my invention consists in a bar or rod adapted to slide longitudinally along the shaft,—the forward end of the bar being provided with an ordinary hook to which the hold-back strap is attached, and the rear of the bar terminating in a brake bent at or nearly at right angles thereto—the sliding bar and brake being preferably formed in one and the same piece, thus avoiding any interposed mechanism between them, which thereby simplifies the construction and insures greater strength and more reliable and prompt action, and my invention also consists in a certain device for locking the brake and preventing its pressure being applied to the wheel when backing the vehicle, to be hereinafter described and claimed.

To enable others skilled in the art to understand and use my invention I will proceed to describe the manner in which I have carried it out.

In the said drawings A A are a pair of ordinary carriage thills connected with an axle B mounted on wheels C C. Extending longitudinally under each shaft is a bar $a$ (of wood or metal) provided with slots $b$ through which and into the shaft pass headed pins or screws $c$ and by which the bar is held thereunder and is free to slide back and forth for the following purpose: The forward end of each bar terminates in or is provided with a hook $d$ (similar to the hold-back hook ordinarily secured permanently to the under side of the shaft) while the rear of each bar $e$ is bent outwardly at or nearly at right angles to the main portion and terminates at a short distance from and immediately in front of the periphery of its corresponding wheel C. The outer end of this bent portion $e$ forms the brake proper $h$ which may be provided with a shoe or friction pad. The normal position of each brake or its shoe is at a point slightly in advance of the periphery of the forward wheel, being carried there by the pressure of a spring $i$ secured at one end 8 to the cross bar D connecting the two thills A A.

From the foregoing construction it will be seen that the pressure of the carriage against the horse is relieved and transmitted through the hold back to the sliding brake bars, causing the brakes to exert a pressure against and clamp the wheels in proportion to the degree of pressure exerted by the descending carriage against the horse, the result of which is the strain upon and springing of the knees of the horse incident to a carriage not provided with a brake, as well as danger of breaking the harness is entirely avoided, while the liability of accident incurred in fast driving down hill can not arise. When the horse reaches the foot of the hill the pressure of the carriage on the hold back is relieved and as the horse begins to draw (whether on level ground or ascending a hill) the springs $i$ assert themselves and push the brakes away from contact with the wheels.

In backing the carriage, as the pressure of the horse on the hold back would cause the brakes to be applied to the wheels I have devised the following means by which the brakes may be readily and instantly locked away from the wheels, prior to backing.

G is a strong rod extending transversely under and between the shafts A, and having its bearings in lugs or ears $k$ projecting down from the under side of a cross piece H secured at each end to the sliding brake bars $a$. The extremities of the rod G project beyond the outside of the thills and are bent or turned up so as to form hooks $l$ which when swung forward (as seen in full lines Fig. 4) catch over studs $m$ projecting from the outsides of the shafts, and when in this position reliably prevent any sliding movement of the brake bars, and consequently keep the brakes locked out of contact with the peripheries of the wheels—the aforesaid rod G with its hooks forming my brake-locking device—the hooks in their normal position being disengaged from the studs $m$ (see dotted lines Fig. 4). The center of the rod (Fig. 5) or side of rod (Fig. 6) is bent out rearward at or nearly at right angles to its main portion so as to form a loop $n$ the weight of which causes the rod to rock into a position to free its hooks from the studs. To this loop $n$ is attached a strap $p$ which is led up to a rein holder or clamp $r$ located to the right, left or center of the dasher I within convenient reach of the driver, by which arrangement when the carriage is to be backed, the strap $p$ is pulled up so as to rock the rod G into the position for engaging its hooks with the studs $m$ thus preventing the backward movement of the brake bars $a$ and holding the brake out of contact with the wheels, after which (when the carriage has been backed sufficiently) the strap $p$ is lowered so as to allow the weighted loop $m$ to assert itself and drop.

I prefer to make the brakes and its bar in one piece as such construction is of minimum simplicity and the action of the brake most positive.

The cross piece H may be omitted with the exception of the lugs $k$ which form the bearings for the ends of the rod G. A single sliding bar similar to $a$ may be applied to the pole of a vehicle and the rear of the bar be bifurcated—the bifurcations $s$ terminating in enlargements which extend to points immediately in front of the peripheries of the wheels and form brakes therefor. (See Fig. 7.)

My within described invention may be readily applied at small expense to carriages either new or those already in use.

I claim—

1. In combination with an automatic brake for carriages—the locking device, consisting of the rod G with its hooks $l$ and the shafts A with their lugs $k$ and studs $m$, and a means of disengaging the hooks from the studs $m$ in order to liberate the brake, as specified.

2. The rod G with its hooks $l$ and weighted loop $n$ and the shafts A with their lugs $k$ and studs $m$, in combination with the strap $p$ and rein-holder $r$, as and for the purpose set forth.

Witness my hand this 3d day of May, 1892.

EDWARD A. MERRIMAN.

Witnesses:
ISAAC S. PIERCE,
M. LILLIAN WARE.